Figure 6:
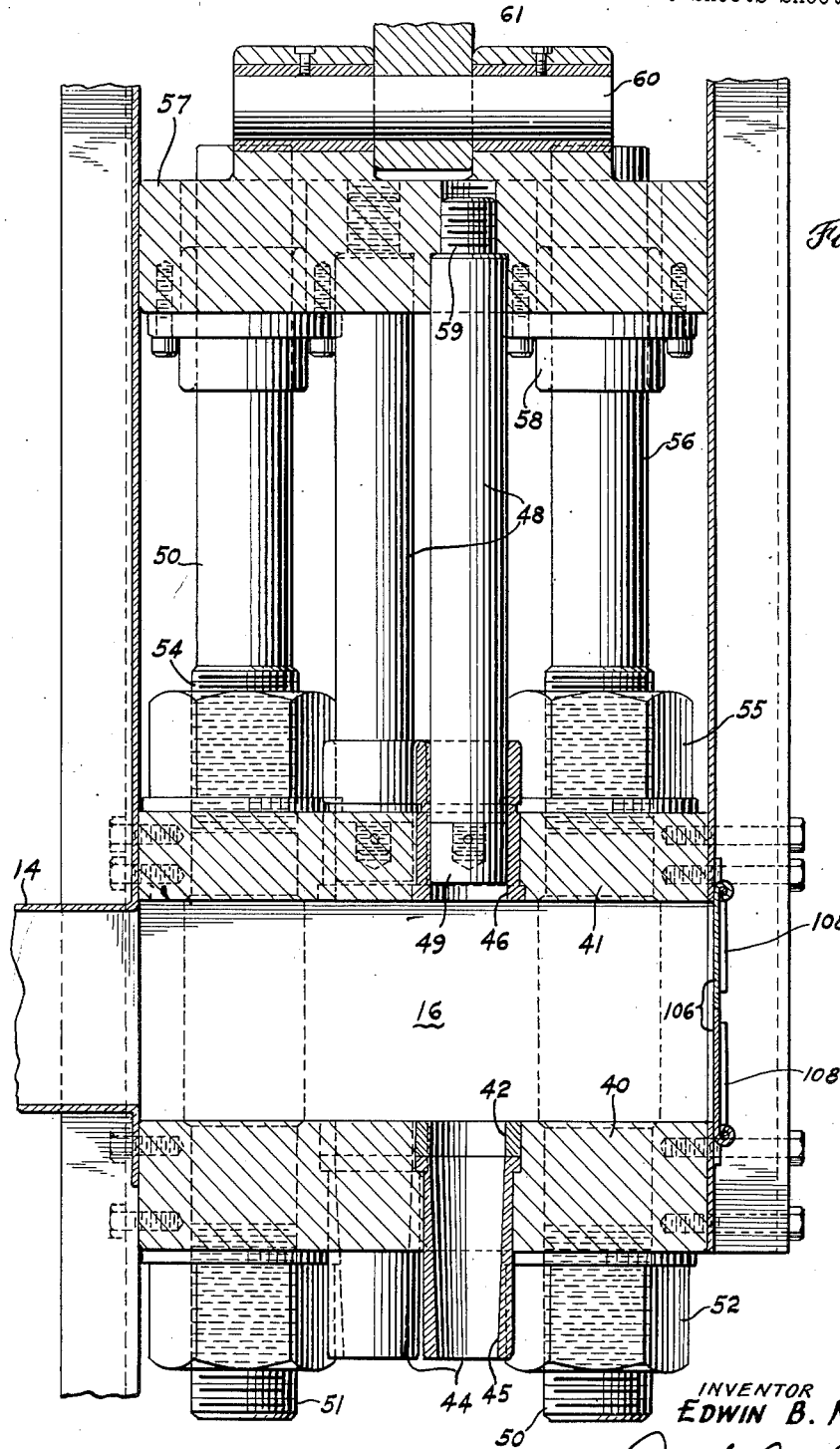

May 29, 1962 E. B. NOLT 3,036,515
HAY PELLETER
Filed March 17, 1959 5 Sheets-Sheet 1
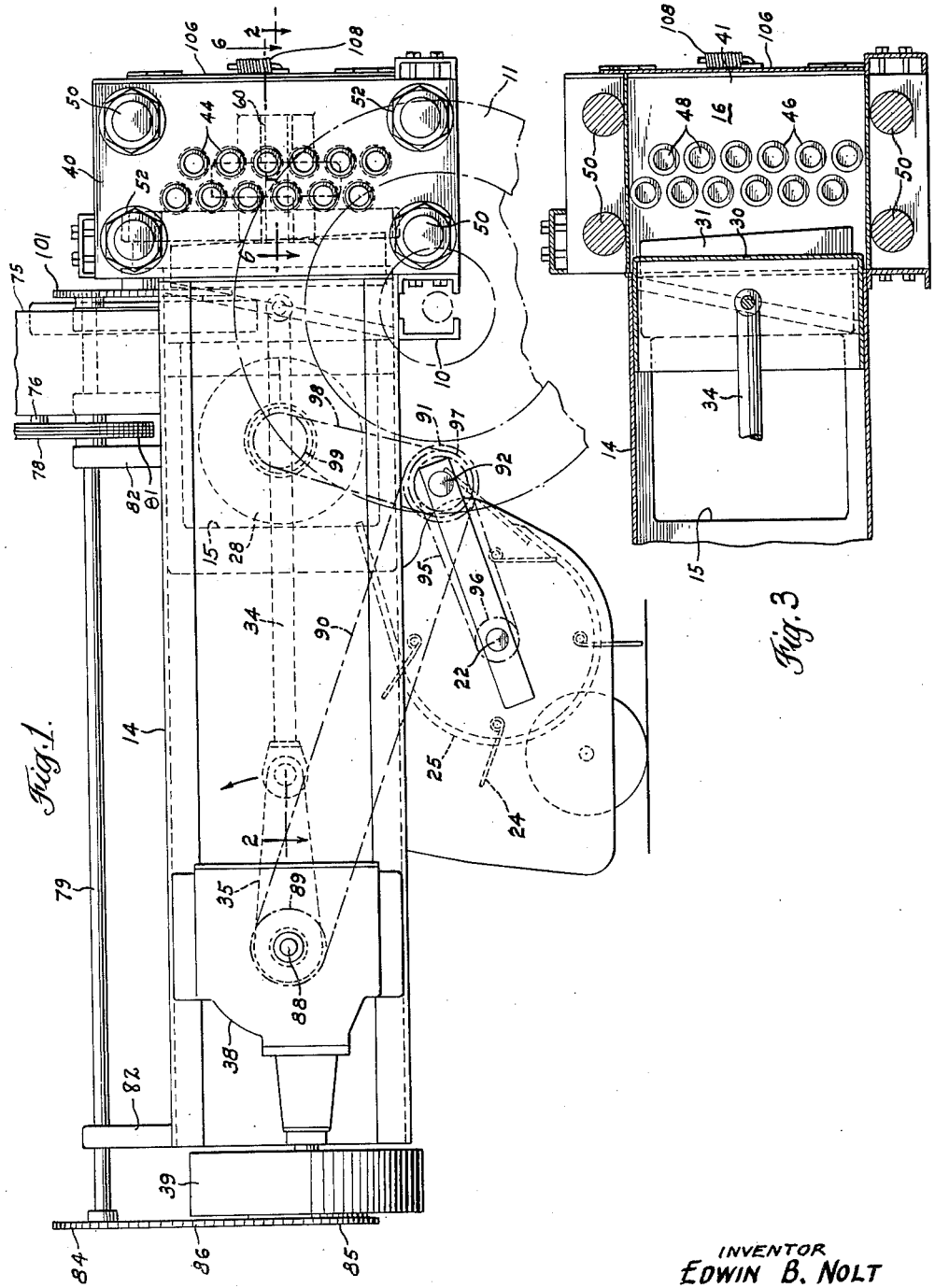
INVENTOR
EDWIN B. NOLT
By Joseph Allen Brown
ATTORNEY

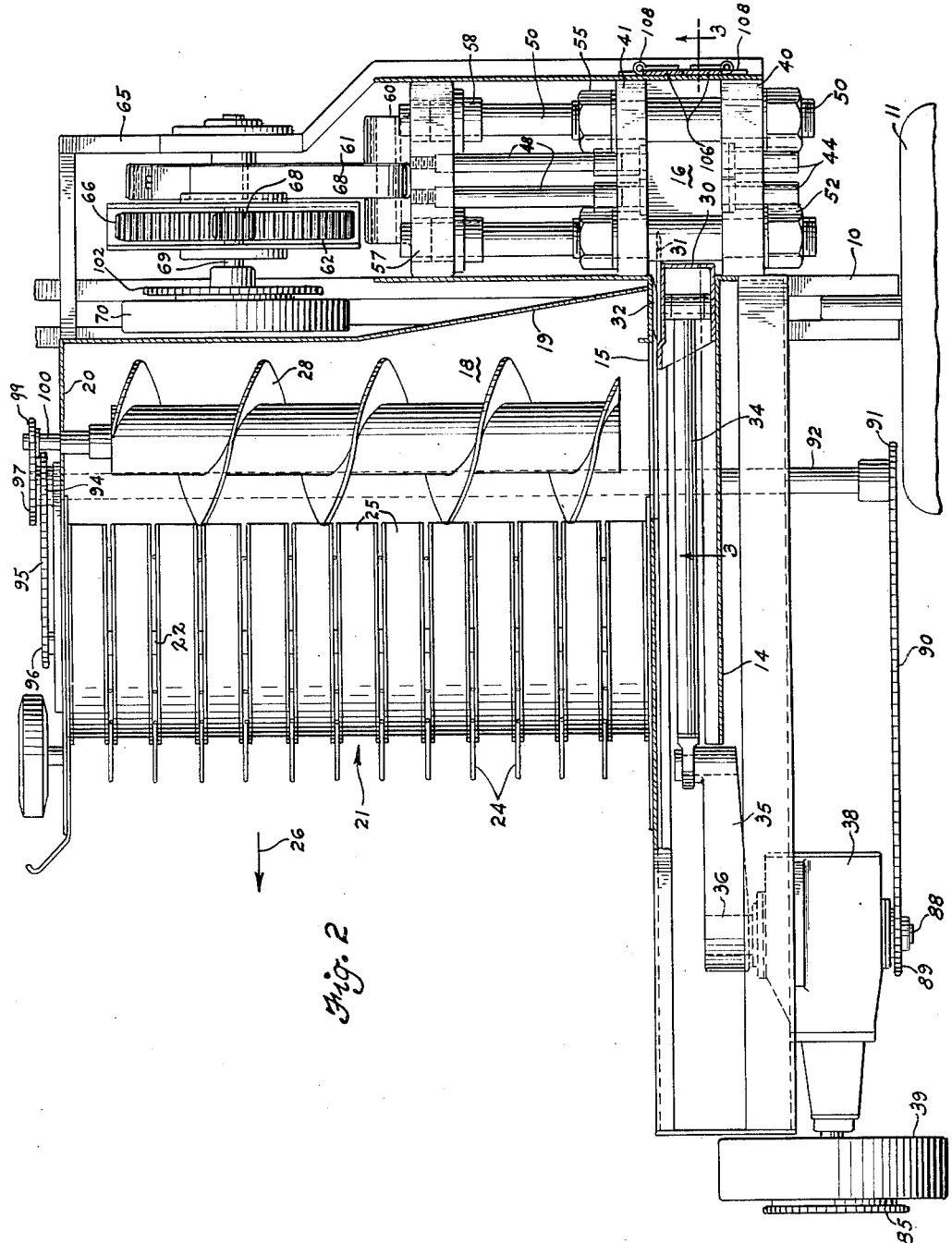

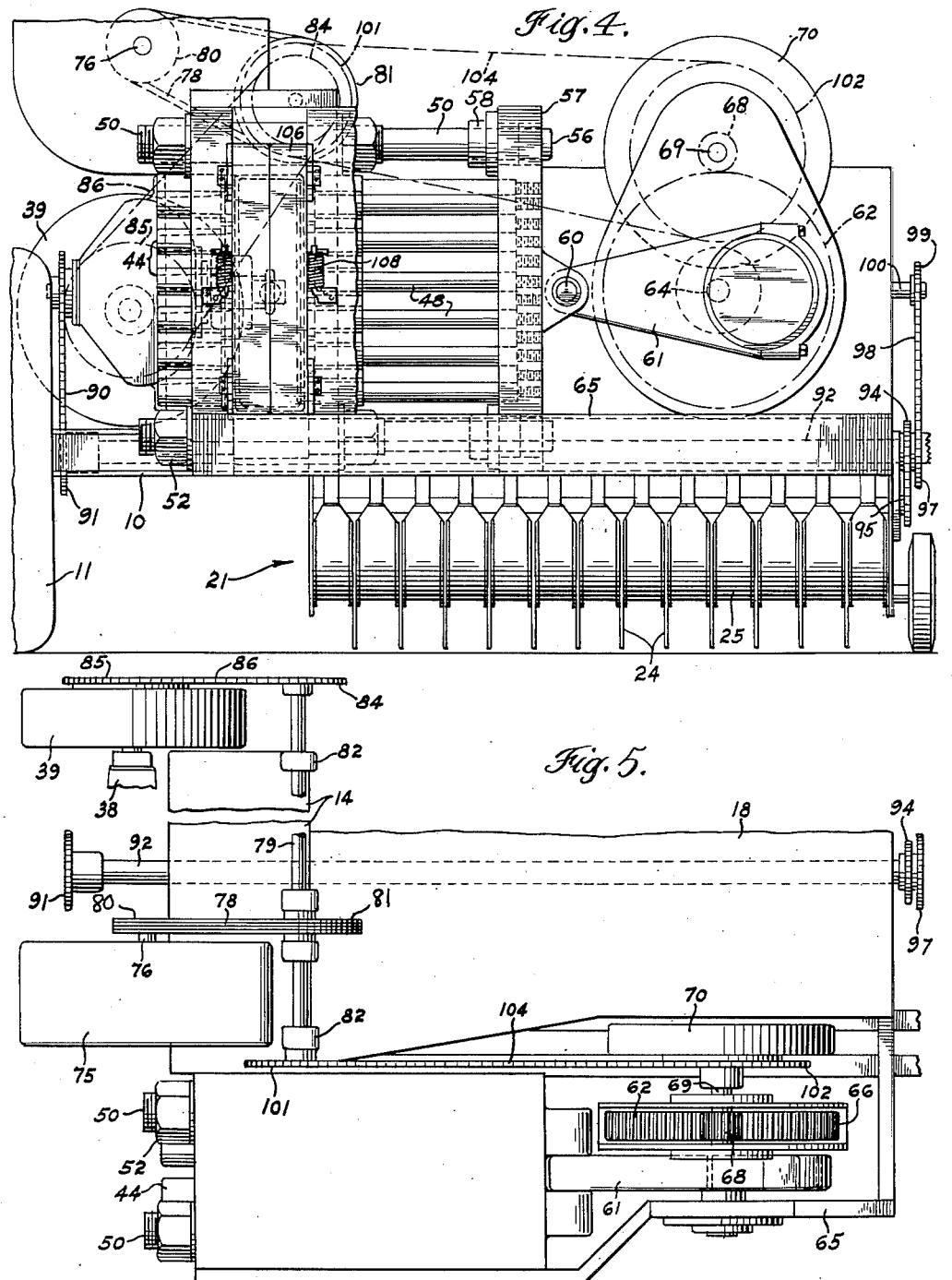

INVENTOR
EDWIN B. NOLT
By Joseph Allen Brown
ATTORNEY

May 29, 1962 E. B. NOLT 3,036,515
HAY PELLETER
Filed March 17, 1959 5 Sheets-Sheet 5

INVENTOR.
EDWIN B. NOLT
BY Joseph Allen Brown
ATTORNEY

United States Patent Office 3,036,515
Patented May 29, 1962

3,036,515
HAY PELLETER
Edwin B. Nolt, New Holland, Pa., assignor to Sperry Rand Corporation, New Holland, Pa., a corporation of Delaware
Filed Mar. 17, 1959, Ser. No. 800,014
5 Claims. (Cl. 100—41)

This invention relates generally to agricultural machines and more particularly to implements for forming crop material into pellets.

At present, a common way to harvest hay is to use an automatic hay baler. Such baler picks up cut and windrowed crop material and conveys it into a bale chamber in separate charges or increments which are compressed and formed into units, a series of which produce a bale. After each bale is completed, it is banded with wire or twine and subsequently discharged onto the ground or delivered to a trailing wagon. Most balers utilize a substantial compression of the hay. Generally, the hay is about twelve times as dense when formed into a bale than when it is lying in a windrow ready to be picked up and baled. Even though a bale has considerable density, it has to be tied before it leaves the baler. Otherwise, the bale slices or charges will separate from each other when each bale is discharged.

It is known that if crop material is compressed to a greater degree than used in baling, such as three or four times as much, the hay will hold itself together and will not have to be tied. It has been found desirable to form hay into pellets about five inches in diameter and a few inches thick. Pellets this size can be handled readily with automatic equipment and fed to cattle as feed. Even though the pellets have sufficient density to bind themselves together, animals are able to consume the pellets and break them apart.

Pelleting machines are presently available which will pick crop material from a field and form it into pellets. However, such machines are generally large, cumbersome implements which grind the hay to place it into suitable condition for forming it into very small pellet size pieces, usually less than an inch in diameter. Grinding the hay reduces its feed value and has other disadvantages. Usually, when such pellets are fed to animals, natural roughage has to be included with the pellets.

One object of this invention is to provide a field machine which will operate in a continuous manner to form crop material into pellets of the five inch size variety.

Another object of this invention is to provide a field machine having pellet forming means and a mechanism for continuously delivering material thereto.

Another object of this invention is to provide a machine of the character described which will form material into pellets as the material comes from a windrow, there being no necessity for grinding or otherwise treating the material.

Another object of this invention is to provide a machine which will readily form crop material into pellets of such density that no tying medium is required to hold them together.

A further object of this invention is to provide a machine having means for recirculating material which may pass the pellet forming means.

Other objects of this invention will be apparent hereinafter from the specification and from the recital in the appended claims.

Figure 7:
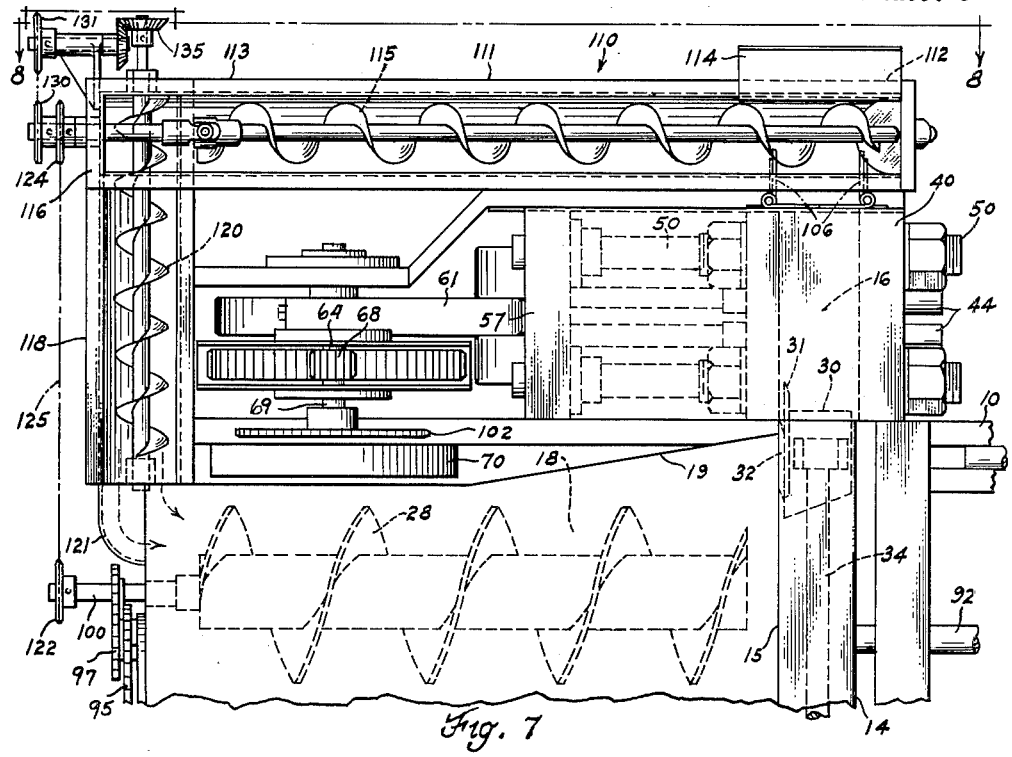
Figure 8:
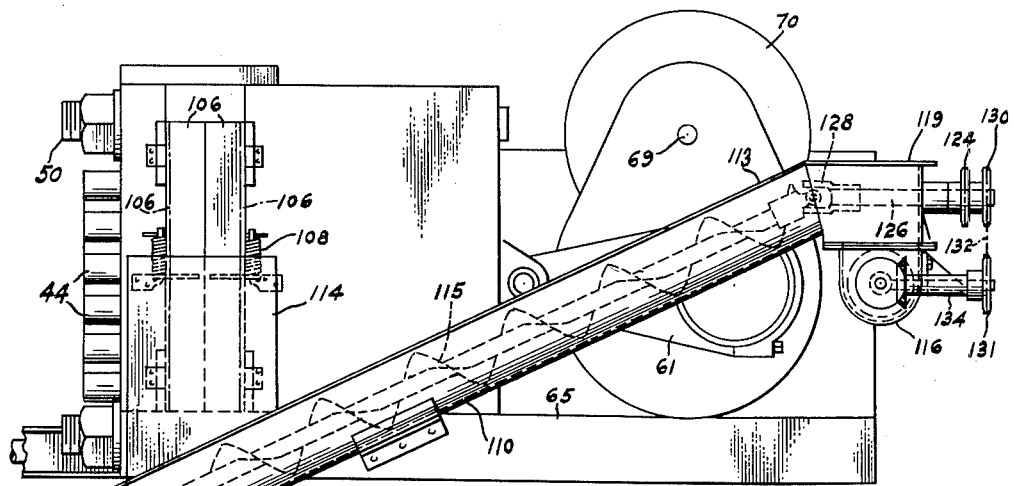

In the drawings:
FIG. 1 is a side elevation of a mobile field pelleting machine constructed according to this invention;
FIG. 2 is a plan view of FIG. 1;
FIG. 3 is a fragmentary section taken on the line 3—3 of FIG. 2 looking in the direction of the arrows;
FIG. 4 is a rear view of the machine;
FIG. 5 is a fragmentary, generally diagrammatic plan view showing the driving means of the machine;
FIG. 6 is a section, on a greatly enlarged scale, taken on the line 6—6 of FIG. 1 and looking in the direction of the arrows;
FIG. 7 is a plan view showing a pelleting machine constructed according to another embodiment of this invention; and
FIG. 8 is an end view taken on the line 8—8 of FIG. 7 looking in the direction of the arrows.

Referring now to the drawings by numerals of reference, and first to the embodiment of the invention shown in FIGS. 1-6, 10 denotes a transverse frame member supported at its respective ends by ground wheels 11, one of which is shown. Such frame is adapted to be suitably connected to a tractor or other vehicle whereby the structure can be towed over a field having crop material to be havested.

Mounted on frame 10 and extending fore-and-aft relative thereto is a feed chamber 14 having an opening 15 in a vertical side wall thereof. Chamber 14 has a compartment 16 at its rearward end into which crop material is adapted to be delivered, as will be subsequently described. Extending laterally of the feed chamber 14 is a hay receiving platform 18 provided with an upstanding back wall 19 and a side wall 20 spaced laterally from chamber 14.

Mounted in front of hay receiving platform 18 is a conventional pickup 21 comprising a reel including a shaft 22 and pickup fingers 24 movable between fore-and-aft extending, laterally spaced, stripper members 25. When the machine is towed forwardly, as indicated by the arrow 26 (FIG. 2), the pickup engages the windrowed crop material, picks it up and conveys it rearwardly to the feed platform 18.

Extending transverse relative to the direction of travel of the machine, is an auger 28 suitably supported at one end on side wall 20. Auger 28 is aligned with the opening 15 in the feed chamber 14 and is adapted to convey crop material through such opening. The auger receives the crop material as it comes from the pickup and conveys it laterally across the feed platform 18.

Reciprocable in feed chamber 14 is a plunger 30 which moves back and forth across the opening 15. When in retracted position, the working face of the plunger is forwardly of the opening 15. However, when the plunger is extended, as shown in FIG. 2, the plunger is positioned rearwardly of opening 15. Plunger 30 carries a knife 31 which cooperates with a stationary knife 32 adjacent the rearward edge of opening 15 whereby with each rearward stroke of the plunger, the crop material delivered into the feed chamber by auger 28 is cut off and separated from the crop material on the feed platform.

Plunger 30 is reciprocated like the plunger in a conventional baler by means of a connecting rod 34 driven by a crank arm 35 keyed to an output shaft 36 projecting from a gear box 38. Power is supplied to the gear box by means including a flywheel 39.

Plunger 30 is adapted to deliver crop material to compartment 16 and compress it to a density approximately equal to the density of a conventional hay bale. To transform material in such condition into hay pellets of three or four times greater density, a pelleting structure constructed according to this invention is provided and will now be described.

Compartment 16 has a pair of laterally spaced vertically extending side walls 40 and 41. As shown in FIG. 2, when the crop material is delivered rearwardly it is conveyed into the space between these walls. Both of the walls are fixed walls. The wall 40 has die openings 42 arranged as best shown in FIG. 1. In the illustration, twelve die openings are shown. However, a greater or lesser number could be provided as desired. Each die opening 42 is cylindrical, FIG. 6. It communicates with an associated choke 44 having a tapered bore 45, such tapering beginning with the inner end of the choke and extending outwardly. In view of the progressively reducing diameter of each choke 44, it will be apparent that crop material forced therein will be compressed as it is moved toward the outer end of the choke.

Aligned with the die holes 42 in wall 40 are a similarly arranged group of holes or openings 46 in wall 41. Reciprocable through the holes 46 are punches 48, there being one punch for each hole. Each punch 48 has a working end 49 which is disposed outside the compartment 16 when the punches are retracted, FIG. 6. However, when the punches are extended, they project across compartment 16 and into die openings 42. When the compartment 16 is filled with crop material, such material is adapted to be forced into the chokes 44 by the punches and compressed.

Walls 40 and 41 are held in fixed relation relative to each other by means including four shafts 50 having threaded ends 51 on which nuts 52 are threaded to anchor wall 40 in place. Threaded sections 54 are also provided on shafts 50 on which nuts 55 are threaded to anchor wall 41 in place. The shafts 50 also have peripherally smooth portions 56 which provide guide rods for a slide block 57 adapted to carry the punches 48. The slide block has guide sleeves 58 through which the sections 56 of the shafts 50 pass. Suitable lubrication is provided between the parts so that the guide block may slide readily relative to the shafts.

The ends 59 of the punches 48 remote from wall 41 are threaded into the slide block 57. The outer side of the slide block has mounted thereon a cross pin 60 to which one end of a crank arm 61 is connected. The crank arm 61 is pivotally connected eccentrically with a bull gear 62 (FIG. 4) carried on a shaft 64 suitably journalled in frame structure 65 rearwardly of the feed platform 18. The bull gear 62 has peripheral teeth 66 which mesh with a pinion 68 carried on a shaft 69 connected to a flywheel 70.

The driving mechanism for the various components of the machine can be best seen from FIG. 5. Mounted on top of the bale chamber 14, and other suitable supporting structure, is a motor 75 having an output shaft 76 connected through endless belts 78 to a fore-and-aft extending shaft 79. The belts 78 extend around pulleys 80 and 81 on the shafts 76 and 79, respectively. Suitable support blocks 82 are provided to journal the shaft 79. At its forward end, shaft 79 carries a sprocket 84 connected to a sprocket 85 on flywheel 39 by means of an endless chain 86. Therefore, power from the motor 75 operates through endless belts 78, shaft 79, chain 86, flywheel 39, gear box 38 and crank arm 35 to reciprocate the plunger 30.

For driving the pickup 21, drive is taken from the gear box 38 (FIG. 2) through an output shaft 88 having a sprocket 89 keyed thereon. Sprocket 89 drives through an endless chain 90 to a sprocket 91 keyed to a shaft 92 which extends across the baler to the outboard end of the pickup. Shaft 92 has a sprocket 94 which is connected through an endless chain 95 to a sprocket 96 keyed to the shaft 22 of the pickup reel. Also connected to the outboard end of the shaft 92 is a sprocket 97 which drives an endless chain 98 connected to a sprocket 99 on the shaft 100 which operates the auger 28. Therefore, it will be seen that the gear box 38 in addition to providing the power for reciprocating the plunger 30 provides the drive for operating the pickup 21 and the auger conveyor 28.

Referring further to FIG. 5, it is shown that the rearward end of shaft 79 carries a sprocket 101 connected to a sprocket 102 through an endless chain 104. Sprocket 102 is connected to the shaft 69 which carries the pinion 68 for driving the bull gear 62 for reciprocating slide block 57 and thus the punches 48. Therefore, it is seen that the single motor 75 operates all components of the pelleting mechanism.

As shown in FIGS. 2, 4 and 6, the rearward end of compartment 16 is closed by a pair of doors 106 pivotally mounted on the walls 40—41 and biased toward closed position by springs 108. The doors 106 constitute overload control means whereby an excessive amount of material accumulated in compartment 16 can be discharged rearwardly of the machine.

In operation, with the machine travelling forwardly as indicated by the arrow 26, the pickup 21 engages the cut and windrowed crop material, elevates it and conveys the material rearwardly to the feed platform 18. The transverse auger 28 engages the material and conveys it laterally. As the material comes from the discharge end of the auger, it passes through the opening 15 and into the feed chamber 14 between strokes of plunger 30. The fore-and-aft reciprocating plunger 30 transfers the material from the auger to the compartment 16. The spring pressure holding doors 106 closed is substantial and the plunger 30 compresses the hay in compartment 16 to a density approximately equal to the density of a conventional hay bale. In essence, therefore, the plunger 30 in addition to constituting a feeding means, provides a precompression means.

The material in compartment 16 is disposed between the chokes 44 and the punches 48. When the punches reciprocate, they cross compartment 16 and force the crop material into the chokes 44. The tapered bores 45 insure that the crop material is compressed as it is forced from the machine. Generally, the material is compressed to a density of from three to four times greater than the density of the hay in compartment 16. Successively formed pellets force out previously formed pellets. While no mechanism is shown for receiving the pellets, it is intended that an endless conveyor of any suitable type be provided to receive the pellets as they come from the chokes 44. Thereafter, the conveyor can move the pellets to a suitable receptacle such as a trailing wagon.

The pellets formed by the apparatus described have sufficient density that no tying medium is required to hold them together. However, the density of the pellets is not so great that the pellets cannot be used as animal feed. The machine operates in a continuous manner. The drive between plunger 30 and punches 48 is timed whereby the plunger will deliver material into compartment 16 between successive working strokes of the punches.

The crop material delivered past or rearwardly of the paths of punches 48 fills the area of compartment 16 rearwardly of the punches and chokes. A rear wall composed of crop material is thus provided. In the event of overload, this rear wall of material will be forced out through the doors 106. So as not to lose material discharged through the doors 106, recirculation means 110 constructed as shown in FIGS. 7 and 8 may be provided.

Mounted on the rear of the machine is a trough 111 extending transversely on an incline from a lower end 112 to an upper end 113. The lower end of the trough is disposed behind and below doors 106 whereby material forced through the doors will drop into the trough. A baffle plate 114 is provided to prevent material from falling over the trough.

Operable in trough 111 is a screw conveyor 115. This conveyor moves material upwardly toward the end 113 of the trough and discharges the material into a rearward end 116 of a fore-and-aft extending trough 118. Suitable shielding 119 is provided to deflect the material into trough 118. A screw conveyor 120 rotates to deliver material in trough 118 forwardly and toward a curved plate 121 which directs material inwardly toward patform 18 and auger 28.

The drive for screw conveyors 115 and 120 is taken from shaft 100 for auger 28, there being a sprocket 122 connected to a sprocket 124 through an endless chain 125. Sprocket 124 drives a shaft 126 connected through universal 128 to the screw conveyor 115. Shaft 126 has a second sprocket 130 keyed to it which drives a sprocket 131 through an endless chain 132. Sprocket 131 rotates a suitably journaled shaft 134 which through bevel gearing 135 drives screw conveyor 120.

With this structure, when material is discharged through doors 116 it falls into trough 111 and is conveyed therethorugh by screw conveyor 115 to trough 118. In trough 118 conveyor 120 acts upon the material to convey it forwardly and against curved plate 121. From there the material is deflected onto platform 18 and is conveyed by auger 28 back into chamber 14 through opening 15. Plunger 30 operates then to move the material back into compartment 16.

While this invention has been described in connection with particular embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. A hay pelleter comprising a compartment having an inlet at one end and an outlet at an opposite end, means for feeding crop material into said compartment through said inlet, means for forming a portion of such material into pellets, the remainder of the material being adapted to be discharged through said outlet, and recirculation means for conveying material discharged through said outlet back to said feeding means.

2. A hay pelleter comprising a compartment having an inlet and an outlet, means for conveying crop material through said inlet, out through said outlet and then back through said inlet, and means operably associated with said compartment for forming pellets out of material conveyed therethrough.

3. A hay pelleter comprising a longitudinal feed chamber having a compartment at a rearward end and a feed opening forwardly of said compartment in a side wall of the chamber, said compartment having an outlet, means for feeding hay into said chamber through said opening, means movable in said chamber and past said opening for conveying hay into said compartment and through said outlet, means for delivering material discharged through said outlet back to said feeding means, and means operably associated with said compartment for forming pellets out of material conveyed therethrough.

4. A method of pelleting hay comprising conveying hay through an endless circuit and while so conveying it taking a portion thereof and forming it into pellets and at the same time adding to the material in circuit to replace that which has been taken for pellets.

5. A hay pelleter comprising a mobile frame, a fore-and-aft extending feed chamber mounted thereon having a feed opening in a vertical side wall thereof, a hay receiving platform supported on said frame and extending laterally from said opening, means carried on said frame for moving hay across said platform in a transverse direction relative to said feed chamber and through said opening, said feed chamber having a compartment at an end thereof rearwardly of said opening, said compartment having a rear door against which material is directed by said plunger, means connected between said compartment and door biasing the door toward closed position, a plunger reciprocable in said chamber and past said opening to move material rearwardly and into said compartment, a punch supported on said frame for reciprocable movement relative thereto in a direction transverse to said feed chamber, said compartment having a pair of laterally spaced walls each having an opening axially aligned one with the other, a choke carried on one of said walls and extending outwardly from the opening therein, said punch being reciprocable through the opening in the other of said walls and across said compartment to force material from said compartment and into said choke, and means for operating said plunger and punch in timed relation whereby material is moved into said compartment between working strokes of said punch.

References Cited in the file of this patent

UNITED STATES PATENTS

| | | |
|---|---|---|
| 657,607 | Luzatto | Sept. 11, 1900 |
| 731,955 | Root et al. | June 23, 1903 |
| 1,823,955 | Sargent et al. | Sept. 22, 1931 |
| 2,700,865 | Russell | Feb. 1, 1955 |
| 2,859,688 | Nolt | Nov. 11, 1958 |

FOREIGN PATENTS

| | | |
|---|---|---|
| 426,428 | Italy | Oct. 24, 1947 |